US 12,451,986 B2

United States Patent
Iannuzzelli et al.

(10) Patent No.: US 12,451,986 B2
(45) Date of Patent: Oct. 21, 2025

(54) EMERGENCY ALERT SECONDARY AUDIO SUBSTITUTION IN DIGITAL RADIO BROADCASTING

(71) Applicant: iBiquity Digital Corporation, Calabasas, CA (US)

(72) Inventors: Russ Iannuzzelli, Calabasas, CA (US); Janet Peyla, Calabasas, CA (US); Jefferey Detweiler, Calabasas, CA (US)

(73) Assignee: iBiquity Digital Corporation, Columbia, MD (US)

( * ) Notice: Subject to any disclaimer, the term of this patent is extended or adjusted under 35 U.S.C. 154(b) by 369 days.

(21) Appl. No.: 18/309,000

(22) Filed: Apr. 28, 2023

(65) Prior Publication Data

US 2024/0364440 A1 Oct. 31, 2024

(51) Int. Cl.
*H04H 20/59* (2008.01)

(52) U.S. Cl.
CPC ......... *H04H 20/59* (2013.01); *H04H 2201/18* (2013.01); *H04H 2201/20* (2013.01)

(58) Field of Classification Search
CPC . H04H 20/59; H04H 2201/18; H04H 2201/20
USPC ................................................... 455/404.1
See application file for complete search history.

(56) References Cited

U.S. PATENT DOCUMENTS

| | | | |
|---|---|---|---|
| 9,986,401 B2 | 5/2018 | El-Dinary | |
| 2003/0093476 A1* | 5/2003 | Syed | H04L 12/1859 709/204 |
| 2009/0128323 A1 | 5/2009 | Milbar | |
| 2016/0165424 A1* | 6/2016 | El-Dinary | H04W 4/06 455/404.2 |
| 2016/0302093 A1* | 10/2016 | Fuller | H04H 60/29 |
| 2018/0139499 A1 | 5/2018 | Iannuzzelli | |
| 2018/0205492 A1* | 7/2018 | Littlejohn | H04L 1/0041 |
| 2019/0380019 A1* | 12/2019 | Buckley | H04W 4/20 |
| 2020/0228956 A1 | 7/2020 | Jurison | |
| 2021/0058763 A1 | 2/2021 | Jurison | |

* cited by examiner

*Primary Examiner* — Maria El-Zoobi
(74) *Attorney, Agent, or Firm* — Lerner David LLP (57) ABSTRACT

A method performed by at an importer-exporter of an in-band on-channel (IBOC) digital radio broadcasting system comprises: receiving, from a first audio client, first protocol data units (PDUs) (first PDUs) of encoded main audio and that include first sequence numbers that progress in a first order; sending the first PDUs for transmission over a logical channel of an IBOC waveform; receiving, from a second audio client, second PDUs of encoded non-main audio and that include second sequence numbers; aligning the second PDUs to the first PDUs by aligning the second sequence numbers to the first sequence numbers, to produce aligned second PDUs; and switching to sending the aligned second PDUs for transmission over the logical channel in place of the first PDUs such that the second sequence numbers of the aligned second PDUs after switching maintain the first order of the first sequence numbers as established prior to switching.

20 Claims, 7 Drawing Sheets

EMERGENCY ALERT SECONDARY AUDIO SUBSTITUTION IN DIGITAL RADIO BROADCASTING

TECHNICAL FIELD

This disclosure relates to digital radio broadcasting.

BACKGROUND

An in-band on-channel (IBOC) digital radio broadcasting system broadcasts main program audio as a sequence of first encoded audio packets on a logical channel of an IBOC waveform. The first encoded packets respectively include first sequence numbers that progress in order. The IBOC digital radio broadcast system may alternately broadcast emergency alert audio from an emergency alert system as second encoded audio packets on the same logical channel of the IBOC waveform. The second encoded audio packets respectively include second sequence numbers that progress in order. The IBOC digital radio broadcast system may switch between broadcasting the main program audio and broadcasting the emergency alert audio in place of the main program audio.

A digital radio receiver receives the IBOC waveform broadcasted by the IBOC digital radio broadcasting system. The IBOC waveform as received includes encoded audio packets, which may be either the first encoded audio packets for the main program audio or the second encoded audio packets for the emergency alert audio. Whichever the case, the digital radio receiver employs a decoding process to recover audio from the encoded audio packets. The decoding process may expect and rely on an orderly progression of the sequence numbers in the encoded audio packets to recover audio seamlessly from the encoded audio packets over time. When the encoded audio packets conveyed on the logical channel switch between the first encoded audio packets and the second encoded audio packets as mentioned above, the corresponding switch between the first sequence numbers and the second sequence numbers may be disjoint and disorderly. As a result, the decoding process may be unable to recover audio seamlessly.

A digital radio receiver receives the IBOC waveform broadcasted by the IBOC digital radio broadcasting system. The IBOC waveform as received includes encoded audio packets, which may be either the first encoded audio packets for the main program audio or the second encoded audio packets for the emergency alert audio. Whichever the case, the digital radio receiver employs a decoding process to recover audio from the encoded audio packets and provide the recovered audio (i.e., decoded audio) as output audio. The decoding process expects an orderly progression of the sequence numbers in the encoded audio packets to recover audio seamlessly from the encoded audio packets over time. When an orderly progression of sequence numbers is not observed, the digital radio receiver switches from outputting the recovered audio to outputting silence and begins to re-establish an orderly progression of sequence numbers. When the orderly progression of sequence numbers is re-established, the audio decoding re-commences, and the silence is replaced with decoded audio. The result presents disjoint audio to a listener.

DESCRIPTION OF EMBODIMENTS

Embodiments

In the United States analog FM radio stations are each assigned a station channel centered on a particular frequency, e.g., 93.1 MHz, with a spacing of 0.2 MHz between channels. Broadcasting both digital and analog radio signals in the same portion of the radio frequency spectrum of a station channel is referred to generically as in-band on-channel (IBOC) broadcasting. Members of the public know IBOC broadcasting by the name HD Radio®, which is a brand name used by iBiquity®. An IBOC digital radio broadcasting system concurrently transmits on a given radio station channel both analog content on an analog modulated carrier and digital content on digitally modulated carriers. On the given radio station channel, the digital content may include main program service (MPS) content on an MPS audio channel including an HD1 channel, and supplementary program service (SPS) content on SPS audio channels, including an HD2 channel, an HD3 channel, and so. An HD channel is a logical channel that comprises a distinct set of the digitally modulated carriers modulated to carry the MPS or SPS content.

In the United States, an Emergency Alert System (EAS) is commonly used to deliver important emergency information over television and radio. The EAS can use a radio broadcaster to broadcast emergency alerts/notifications over radio station channels. For example, upon receiving emergency alert audio to be broadcast, a radio broadcasting station broadcasts the emergency alert audio in place of normal or main program audio. To this end, embodiments presented here employ an IBOC digital radio broadcasting system to broadcast main program audio in addition to emergency alerts including emergency alert audio, as described below. The embodiments ensure that when the IBOC digital radio broadcasting system switches between broadcasting a stream of the main program audio and a stream of the emergency alert audio, sequence numbers embedded in the different streams are aligned to avoid unnecessary excursions in and out of silence by a digital radio receiver that decodes the streams, which facilitates recovery of seamless audio by the digital radio receiver. The embodiments offer further advantages as described below. In the ensuing description, main program audio may also be referred to as "main audio" or "channel audio."

Figure 1:
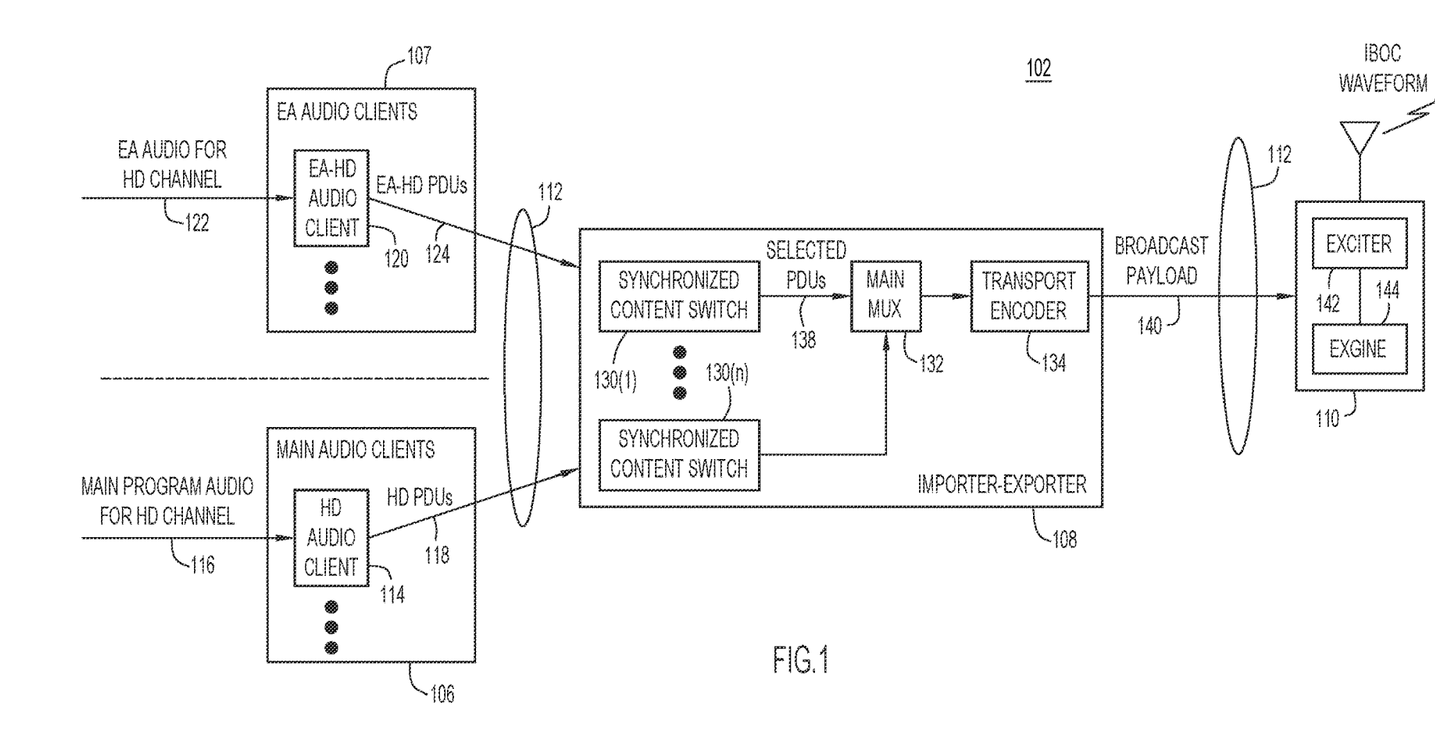
FIG. 1 is a block diagram of an example in-band on-channel (IBOC) digital radio broadcasting system.

FIG. 1 is a block diagram of an example IBOC digital radio broadcasting system 102 configured to selectively broadcast emergency alert (EA) audio (also referred to as an "EAS notification") in place of main audio on a logical channel of an IBOC waveform. IBOC digital radio broadcasting system 102 supports concurrent transmission of MPS audio over an MPS channel (e.g., an HD1 channel) on an IBOC waveform and SPS audio over any of multiple SPS channels (e.g., an HD2 channel, an HD3 channel, and so on) of the IBOC waveform. While the EA audio may be selectively broadcasted on any of the SPS channels, for simplicity, embodiments presented herein focus on a single SPS channel (referred to simply as an "HD channel" below). It is understood that the embodiments apply equally to additional SPS channels.

IBOC digital radio broadcasting system 102 includes main audio clients 106 (also referred to as "channel audio clients") associated with or allocated to the MPS channel and the SPS channels, EA audio clients 107 associated or paired with corresponding ones of the SPS channels, an importer-exporter 108, and a broadcast transmitter 110 connected to each other over a network 112. Network 112 may include one or more wide area networks (WANs), such as the Internet, and/or one or more local area networks (LANs). In other example arrangements, one or more of the aforementioned entities may be co-located with each other, and may therefore communicate directly with each other, which obviates the need for network communications between the co-located entities. Each of the aforementioned audio clients may include a computer device (i.e., an audio client device) that hosts a client audio application configured to implement embodiments presented herein. Each audio client may further include an analog-to-digital (ADC), an audio encoder (e.g., an audio coder or codec), and a PDU buffer.

Generally, main audio clients 106 include an HD1 audio client for the HD1 channel (i.e., the MPS channel), an HD2 audio client for the HD2 channel (i.e., a first SPS channel), an HD3 audio client for the HD3 channel (i.e., for a second SPS channel), and so on. For simplicity, only a single HD audio client 114 for a single HD channel is shown in FIG. 1. HD audio client 114 may represent an HD2 (or HD3, or HD4) audio client for an HD2 (or HD3, or HD4) channel, for example. HD audio client 114 captures main audio 116 for the HD channel, and encodes the main audio into a sequence of HD PDUs 118 that include encoded main audio, and respectively include sequence numbers that progress in an order. Each PDU includes one or more encoded audio packets. HD audio client 114 establishes a network connection (e.g., a Transmission Control Protocol (TCP)/Internet protocol (IP) connection) with importer-exporter 108 over network 112, and transmits to the importer-exporter the sequence of HD PDUs 118 (e.g., as a stream of IP packets). For example, HD audio client 114 executes a login procedure with importer-exporter 108 over the network connection, and then transmits HD PDUs 118 after a successful login.

Generally, EA audio clients 107 include EA audio clients associated or paired with corresponding ones of the SPS audio clients. For simplicity, FIG. 1 shows only a single EA-HD audio client 120 corresponding to the single HD audio client 114. When active on EA-HD audio client 120, EA audio 122 is intended to be transmitted on the HD channel associated with HD audio client 114. When EA audio 122 becomes active, EA-HD audio client 120 encodes EA audio 122 into a sequence of EA-HD PDUs 124 that include encoded EA audio and respectively include sequence numbers that progress in an order. EA-HD audio client 120 establishes a network connection (e.g., a TCP/IP connection) with importer-exporter 108 over network 112, and transmits to the importer-exporter the sequence of EA-HD PDUs 124 (e.g., as IP packets). To gain operational access to importer-exporter 108, EA-HD audio client 120 executes a login procedure with the importer-exporter over the network connection, and transmits EA-HD PDUs 124 after the login procedure is successful.

In general, importer-exporter 108 includes (i) an importer function to manage HD subchannels, emergency alerts, and data services, and (ii) an exporter function to handle timing and synchronization of the HD subchannels to analog audio. Examples of the aforementioned functions and IBOC waveforms are provided in U.S. Patent Application Publication No. 2018/0139499, published May 17, 2018, which is incorporated herein by reference in its entirety. Importer-exporter 108 includes synchronized content switches 130 (1)-130(n) allocated to corresponding ones of the SPS audio channels, a main multiplexer 132 having inputs coupled to outputs of the synchronized content switches, and a transport encoder 134 having an input coupled to an output of the main multiplexer. In the example of FIG. 1, synchronized content switch 130(1) is allocated to the HD channel associated with HD audio client 114, while the other synchronized content switches are allocated to other corresponding HD audio clients and HD channels. Synchronized content switches 130(1)-130(n) are configured similarly to each other. Therefore, the ensuing description of synchronized content switch 130(1) shall suffice for the other synchronized content switches.

Importer-exporter 108 is configured to establish a network connection with HD audio client 114, implement a login procedure with the HD audio client, and then receive from the HD audio client the sequence of HD PDUs 118, as mentioned above. Similarly, importer-exporter 108 is configured to establish a network connection with EA-HD audio client 120, implement a login procedure with the EA-HD audio client, and then receive from the EA-HD audio client the sequence of EA-HD PDUs 124, as mentioned above.

Synchronized content switch 130(1) (more simply referred to as "switch 130(1)") receives as inputs HD PDUs 118 and EA-HD PDUs 124. Based on conditions described below, switch 130(1) selects either HD PDUs 118 or EA-HD PDUs 124 to produce selected PDUs 138, and sends the selected PDUs to transport encoder 134 to main multiplexer 132. Main multiplexer 132 multiplexes selected PDUs 138 with selected PDUs supplied to the main multiplexer by the other synchronized content switches in parallel, to produce a multiplexed stream of selected PDUs, and provides the same to transport encoder 134. Focusing on switch 120(1), at any given time, the switch passes either HD PDUs 118 or EA-HD PDUs 124 to transport encoder 134 through main multiplexer 132. For example, assume at time t1 that switch 130(1) is sending HD PDUs 118 to transport encoder 134. Then at a later time t2, switch 130(1) switches from sending HD PDUs 118 to sending EA-HD PDUs 124 in place of the HD PDUs. That is, the EA-HD PDUs become substitutes for the HD PDUs. The aforementioned switching action may be referred to as a "switchover."

Additionally, prior to the switchover, switch 130(1) aligns EA-HD PDUs 124 to the HD PDUs based on their respective sequence numbers, such that an established order of the sequence numbers (in selected PDUs 138 passed by switch 130(1) to transport encoder 134) is maintained or progresses in regular order across the switchover. Stated otherwise, switch 130(1) ensures that the sequence numbers of selected PDUs 138 after the switchover progress in the order established by the sequence numbers of the selected PDUs prior to the switchover.

Transport encoder 134 assists with converting selected PDUs 138 (and other ones of the selected PDUs included in the multiplexed stream of selected PDUs forwarded by main multiplexer 132) to an HD format to produce a broadcast payload 140, and sends the broadcast payload to broadcast transmitter 110 over network 112. Broadcast transmitter 110 includes an exciter 142 and an exgine 144 that cooperate to convert broadcast payload 140 to an IBOC waveform or signal that conveys the main audio or the emergency alert audio on the logical channel. Broadcast transmitter 110 transmits or broadcast the IBOC waveform over-the-air (OTA).

Figure 2:
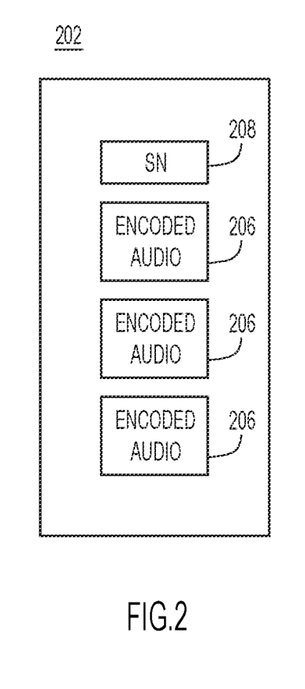
FIG. 2 is an illustration of an example protocol data unit (PDU) produced by an audio client in the IBOC digital radio broadcasting system.

FIG. 2 is an illustration of a PDU 202 produced by an audio client. PDU 202 includes one or more packets of encoded audio 206 (also referred to as "encoded audio packets"). Encoded audio 206 includes encoded main audio or encoded EA audio when PDU 202 is an HD PDU or an EA-HD PDU, respectively. In the example of FIG. 2, each PDU includes 3 encoded audio packets, although more or less encoded audio packets are possible. PDU 202 also includes a sequence number (SN) 208 that enumerates or establishes a sequence number of a first encoded audio packet (e.g., the top encoded audio packet) of the encoded audio packets, and from which the sequence numbers of the remaining audio packets of the PDU may be inferred.

Figure 3:
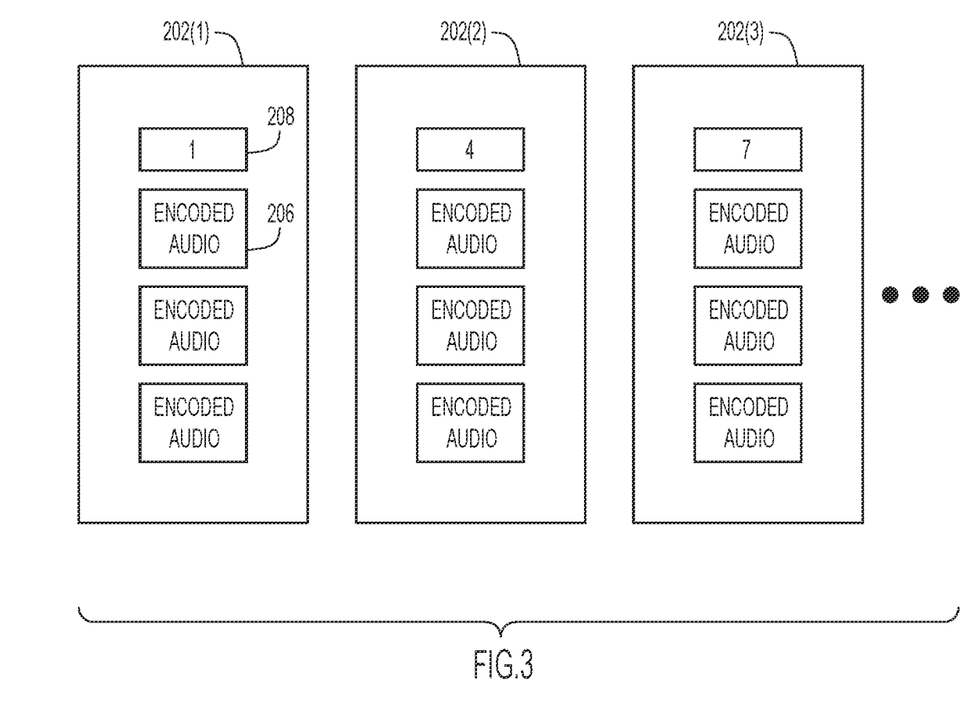
FIG. 3 shows an example sequence of protocol data units (PDUs) carrying respective sequence numbers.

FIG. 3 shows a time-ordered sequence of PDUs 202(1), 202(2), 202(3) respectively including sequence numbers 1, 4, and 7. The sequence numbers progress in order. Specifically, in the example of FIG. 3, the sequence numbers progress (e.g., increase) incrementally by a fixed amount (e.g., 3) that is equal to the number of encoded audio packets in each of the PDUs. Individual sequence numbers for the individual encoded audio packets of each PDU may be inferred from the sequence number expressed in each PDU. For example, PDU 202(2) includes top, middle, and bottom encoded audio packets having incrementing sequence numbers 4, 5, and 6.

Figure 4:
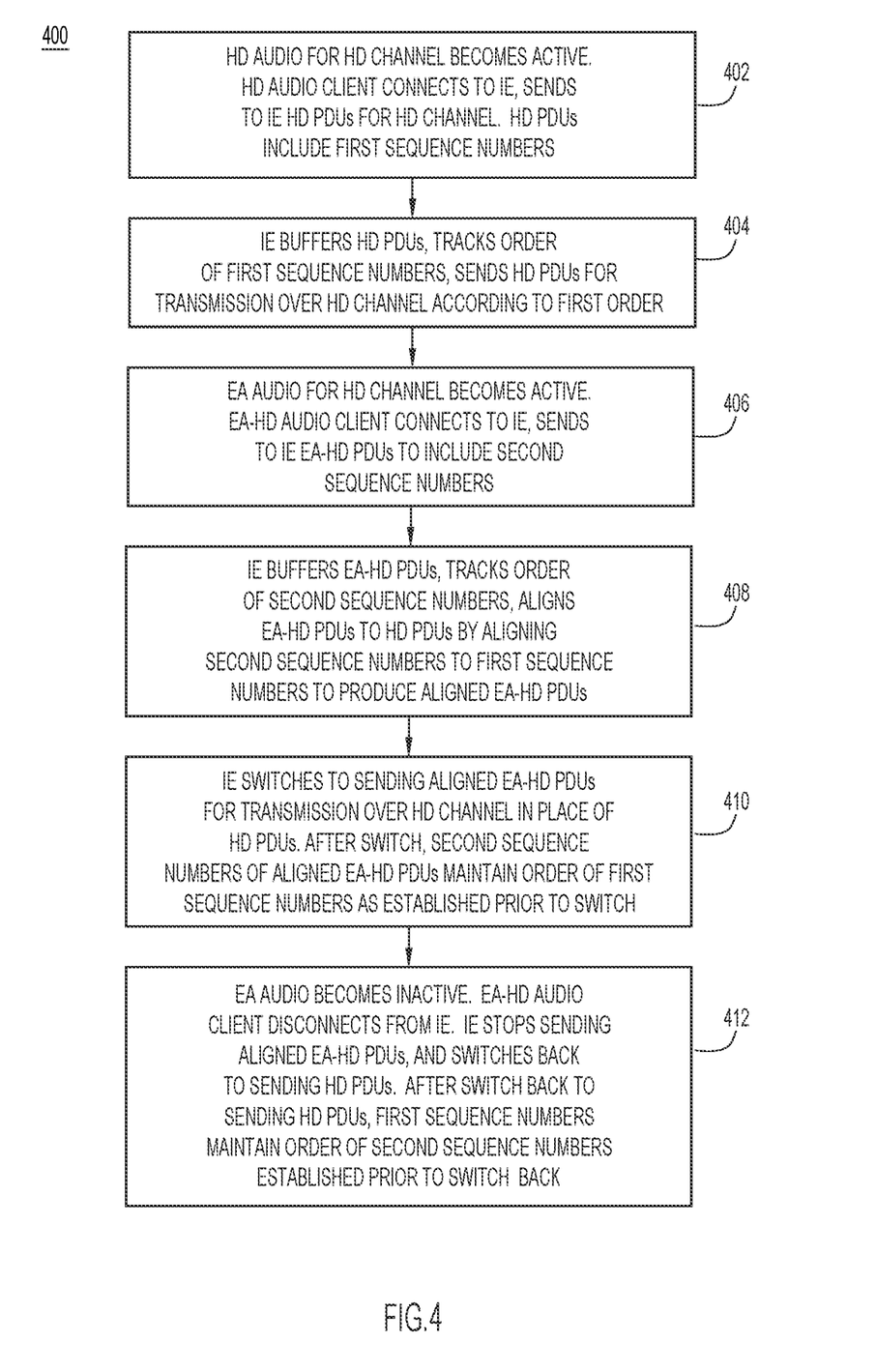
FIG. 4 is a flowchart of an example method of performing a switchover from main program audio to emergency alert (EA) audio on a logical channel of an IBOC waveform.

FIG. 4 is a flowchart of an example method 400 of performing a switch/switchover from HD main (or channel) audio to EA audio that maintains an order of sequence numbers for the HD main audio and the EA audio across the switch/switchover. Method 400 is described with continued reference to FIG. 1.

Initially, EA audio 122 is not active for the HD channel, i.e., the EA audio is not active on EA-HD audio client 120. At 402, HD audio client 114 and importer-exporter 108 establish a network connection to each other and implement a login procedure by which the HD audio client logs into and establishes a session with the importer-exporter. HD audio client 114 encodes main audio 116 into HD PDUs 118 and transmits the same to importer-exporter 108.

At 404, switch 130(1) buffers (i.e., stores in a local memory) HD PDUs 118 when received. Switch 130(1) parses HD PDUs 118 to access content in the HD PDUs. Switch 130(1) examines the sequence numbers (referred to as "first" sequence numbers) included in HD PDUs 118, and tracks an order of the sequence numbers. In the absence of EA audio, switch 130(1) selects HD PDUs 118 as selected PDUs 138 and sends them to transport encoder 134 in the order of the sequence numbers, for transmission on the HD channel in that order. Switch 130(1) also tracks the sequence numbers of HD PDUs 118 (i.e., of selected PDUs 138) as they are sent to transport encoder 134 such that, at any given time, the switch knows the sequence number of the last HD PDU that was sent and the sequence number of the next HD PDU to be sent.

At 406, EA audio 122 for the HD channel becomes active. EA-HD audio client 120 and importer-exporter 108 establish a network connection to each other and implement a login procedure, by which the EA-HD audio client logs into and establishes a session with the importer-exporter. EA-HD audio client 120 encodes EA audio 122 into EA-HD PDUs 124 and transmits the same to importer-exporter 108.

At 408, switch 130(1) buffers EA-HD PDUs 124 when received. Switch 130(1) parses EA-HD PDUs 124 to access their content. Switch 130(1) examines the sequence numbers (referred to as "second" sequence numbers) included in EA-HD PDUs 124 and tracks an order of the sequence numbers. Typically, the sequence numbers of arriving and buffered EA-HD PDUs 124 are offset from and therefore not aligned with the sequence numbers of arriving and buffered HD PDUs 118 since the two streams of PDUs may be generated independently. Accordingly, switch 130(1) aligns or synchronizes EA-HD PDUs 124 with HD PDUs 118 by aligning or synchronizing (e.g., matching) the sequence numbers of the EA-HD PDUs to the sequence numbers of the HD PDUs, to produce/identify "aligned" or "synchronized" ones of the EA-HD PDUs. For example, switch 130(1) derives and maintains matching pointers that point to corresponding ones of buffered EA-HD PDUs and HD PDUs that have matching/aligned sequence numbers. Switch 139(1) may access desired ones of the aligned EA-HD PDUs using the matched pointers.

In an example, EA audio 122 may be considered to be higher priority audio than main audio 116. More generally, EA audio 122 may be considered "non-main audio" that has a higher priority than main audio 116. Accordingly, at 410, switch 130(1) selects the aligned EA-HD PDUS (over HD PDUs 118) as selected PDUs 138, stops sending the HD PDUs to transport encoder 134, and starts sending the aligned EA-HD PDUs to transport encoder 134 (as selected PDUs 138) in place of the HD PDUs. That is, switch 130(1) switches from sending HD PDUs 118 to sending the aligned EA-HD PDUs. Using the above-mentioned matching pointers (which indicate the sequence number of the last HD PDU that was sent as a selected PDU, the sequence number of the next HD PDU to be sent as a selected PDU, and the particular aligned EA-HD PDUs that match the last HD PDU and the next HD PDU), switch 130(1) manages the transition such that the sequence numbers of the aligned EA-HD PDUS (as represented in selected PDUs 138) immediately after the switchover maintain the order of the sequence numbers of HD PDUs 118 (also represented in the selected PDUs) as established prior to the switchover. Switch 130(1) continues sending the aligned EA-HD PDUs in the established order.

At 412, when EA audio 122 for the HD2 channel becomes inactive, EA-HD audio client 120 implements a logoff procedure with importer-exporter 108 by which the EA-HD audio client is logged-off. In response to EA-HD audio client 120 being logged-off, switch 130(1) stops sending the aligned EA-HD PDUs, and starts sending (i.e., resumes with sending) HD PDUs 118 (which represents a second switchover) using the matching pointers such that the sequence numbers of HD PDUs 118 that are sent after the second switchover maintain the order of the sequence numbers of the aligned EA-HD PDUs as established prior to the second switchover.

Figure 5:
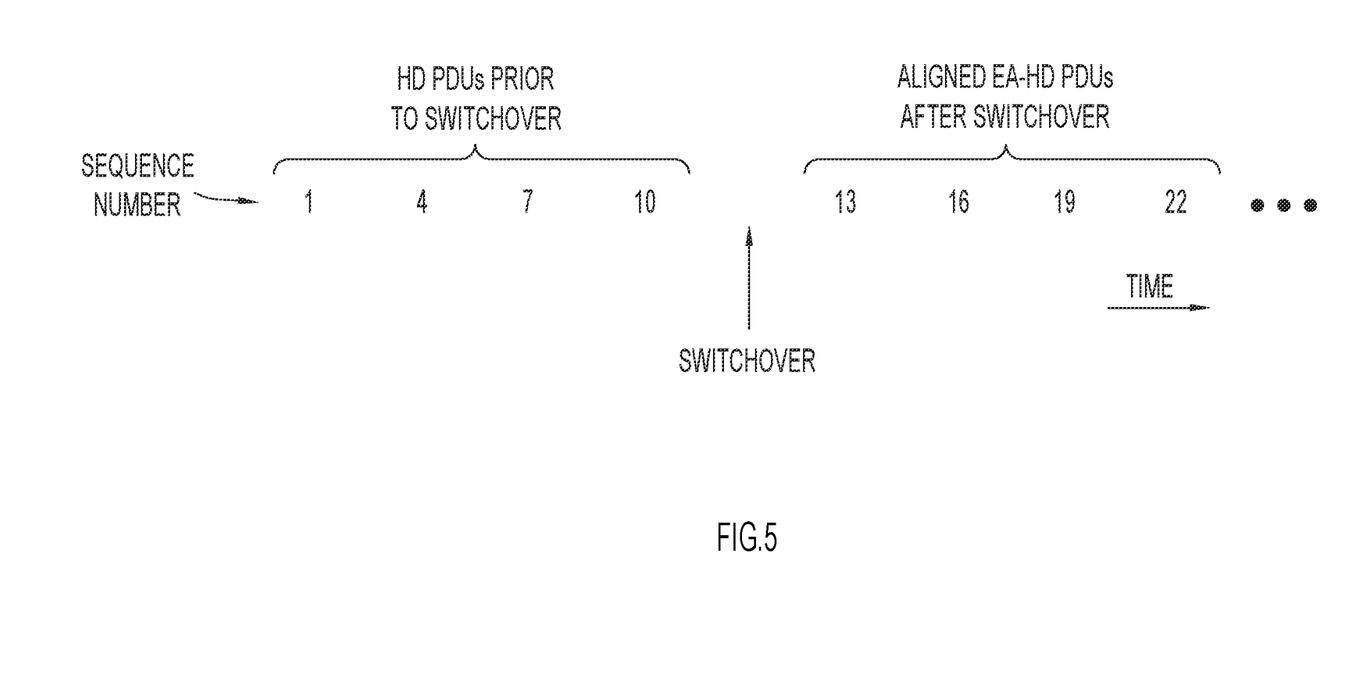
FIG. 5 is an illustration of an example of an orderly progression of sequence numbers of PDUs before and after a switchover from sending HD (for HD Radio®) PDUs to sending EA-HD PDUs.

FIG. 5 is an illustration that shows an orderly progression of sequence numbers of selected PDUs 138 before and after a switchover from sending HD PDUs to sending EA-HD PDUs. Initially, switch 130(1) sends HD PDUs with first sequence numbers 1, 4, 7, and 10 in order. After the switchover, switch 130(1) sends aligned EA-HD PDUs with second sequence numbers 13, 16, 19, and 22, in order. The initial second sequence number (13) after the switchover differs from the (preceding) last first sequence number (10) prior to the switchover by an expected fixed amount (3) (i.e., the fixed amount by which consecutive sequence numbers differ in each of the sequences), which represents an orderly progression or transition from the first sequence numbers to the second sequence numbers across the switch over.

Figure 6:
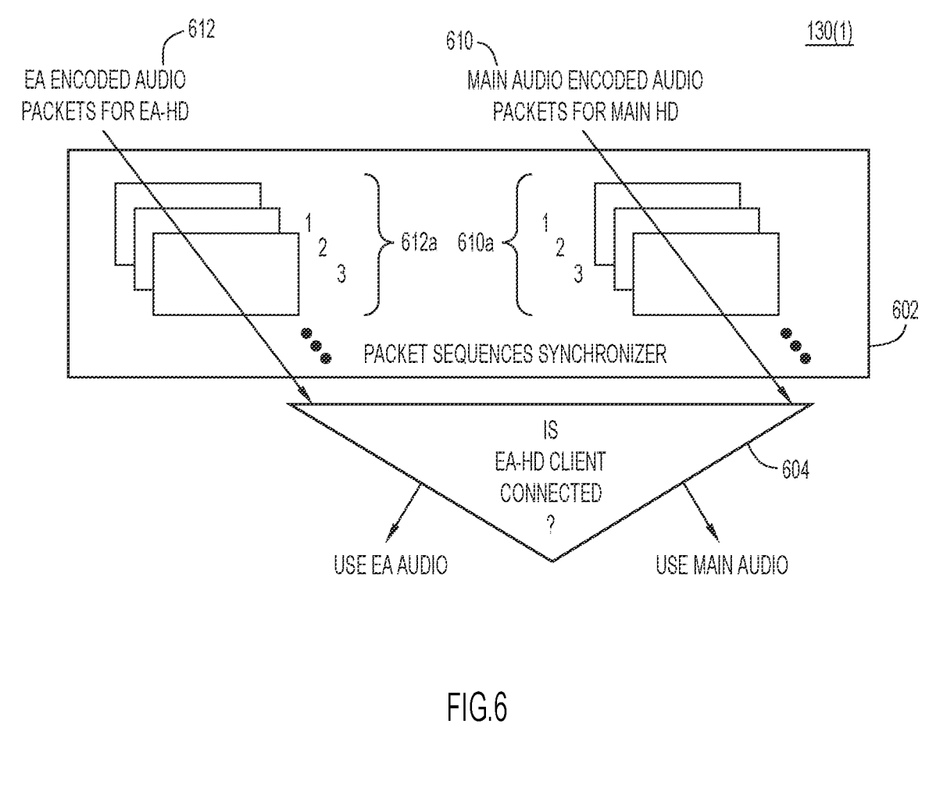
FIG. 6 is an illustration of an example synchronized content switch used in an importer-exporter of the IBOC digital radio broadcasting system.

FIG. 6 is an illustration of switch 130(1) and that shows further operations performed by the switch, according to an embodiment. FIG. 6 shows operations performed on encoded audio packets (from respective PDUs) that are respectively assigned consecutive sequence numbers. Switch 130(1) includes a packet sequence synchronizer 602 followed by an output selector 604. Packet sequence synchronizer 602 buffers a sequence of encoded main audio packets 610 (also referred to as "main audio encoded packets") for the HD channel. Encoded main audio packets 610 have sequence numbers 610a, as shown. Packet sequence synchronizer 602 also buffers a sequence of encoded EA audio packets 612 (also referred to as "EA audio encoded packets") for the HD channel having sequence numbers 612a, and aligns the encoded EA audio packets 612 to encoded main audio packets 610 based on sequence numbers 612a and sequence numbers 610a, as shown.

Output selector 604 responds to connection states of importer-exporter 108. While HD audio client 114 is connected to importer-exporter 108 and EA-HD audio client 120 is not connected, output selector 604 passes encoded main audio packets 610 from packet sequence synchronizer 602 to transport encoder 134. When EA-HD audio client 120 connects to importer-exporter 108 (while HD audio client 114 remains connected), output selector 604 switches to passing aligned encoded EA audio packets 612 from packet sequence synchronizer 602 to transport encoder 134 in place of encoded main audio packets 610. This ensures that that the order of the sequence numbers is maintained across the switchover, which ensures a smooth transition of audio content across the switchover. When EA-HD audio client 120 disconnects (while HD audio client 114 remains connected), output selector 604 switches to passing encoded main audio packets 610 to transport encoder 134 in place of aligned encoded EA audio packets 612, which further maintains packet sequence number synchronization and results in a smooth transition of audio content across the switchover.

Figure 7:
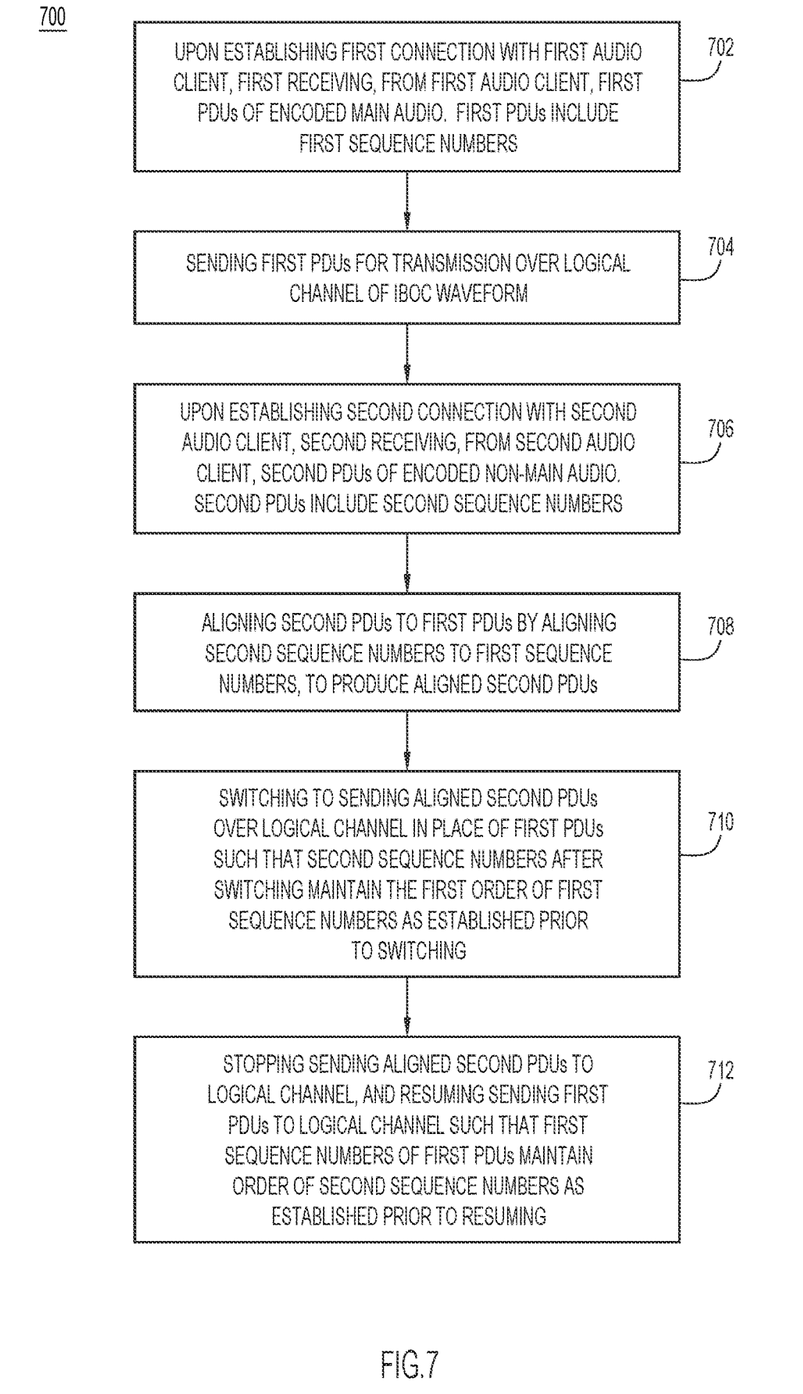
FIG. 7 is a flowchart of another example method of performing a switchover from main program audio to EA audio.

FIG. 7 is a flowchart of an example method 700 of performing a switch/switchover from main audio (e.g., HD main audio) to non-main audio (e.g., EA audio) that has a higher priority than the main audio. The switchover maintains an order of sequence numbers presented by the main audio and the non-main audio across the switchover. Method 700 may be performed primarily by an importer-exporter of an IBOC digital radio broadcasting system.

702 includes, upon establishing a first connection with a first audio client, first receiving, from the first audio client, first (audio) PDUs of encoded main audio. The first PDUs respectively include first sequence numbers that progress in a first order. The first sequence numbers may progress incrementally by a fixed amount.

704 includes sending the first PDUs for transmission over a logical channel of an IBOC waveform, for subsequent OTA transmission.

706 includes, upon establishing a second connection with a second audio client, second receiving, from the second audio client, second (audio) PDUs of encoded non-main audio. The second PDUs respectively include second sequence numbers. The sequence numbers may progress incrementally by the fixed amount. The non-main audio may include an emergency alert notification originated by an emergency alert system.

708 includes aligning the second PDUs to the first PDUs by aligning the second sequence numbers to the first sequence numbers, to produce aligned second PDUs.

710 includes switching to sending the aligned second PDUs for transmission over the logical channel in place of the first PDUs such that the second sequence numbers of the aligned second PDUs after switching maintain the first order of the first sequence numbers as established prior to switching.

712 includes stopping sending the aligned second PDUs to the logical channel, and resuming sending the first PDUs to the logical channel such that the first sequence numbers of the first PDUs maintain an order of the second sequence numbers as established prior to resuming.

Figure 8:
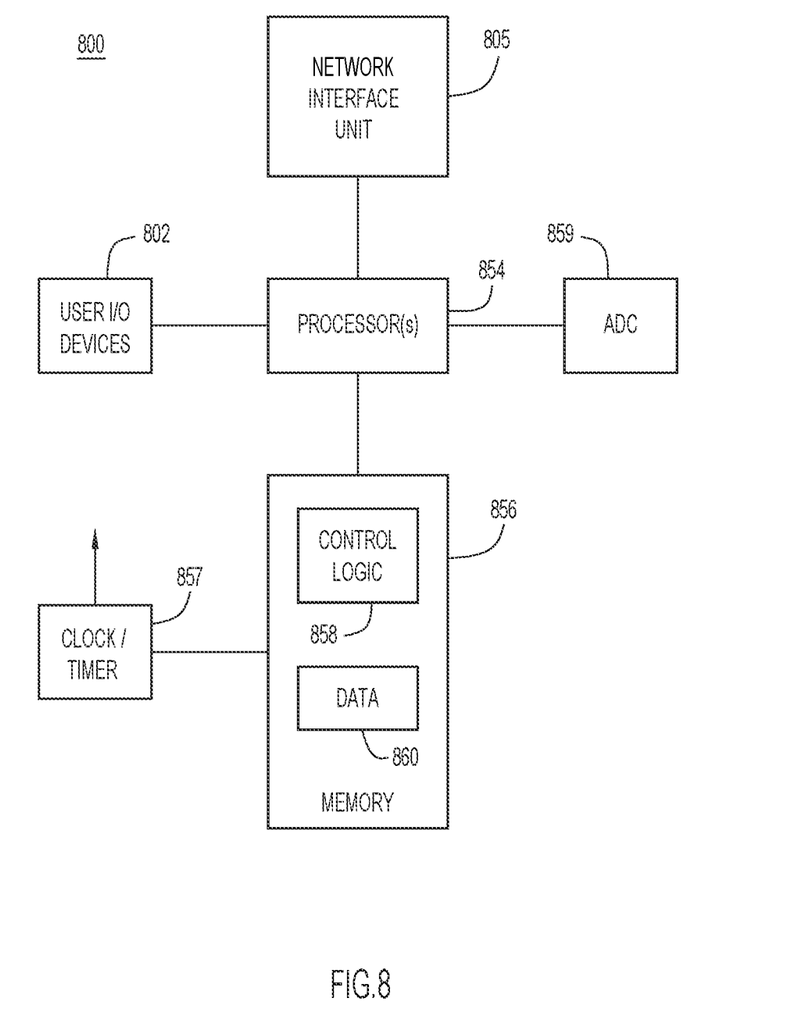
FIG. 8 is a block diagram of an example controller or computer device that may be implemented in an audio client or the importer-exporter of an IBOC digital radio broadcast system to perform operations described herein.

FIG. 8 is a block diagram of an example controller or computer device 800 that may be implemented in an audio client and in an importer-exporter of an IBOC digital radio broadcasting system to perform operations described herein. There are numerous possible configurations for computer device 800 and FIG. 8 is meant to be an example. Examples of computer device 800 include a server, a tablet computer, a personal computer, a laptop computer, a mobile phone, such as a smartphone, computer equipment at a radio broadcasting station, a studio site, and so on. Computer device 800 may represent a controller of any of the aforementioned components.

Computer device 800 may include user input/output (I/O) devices 802 including a display, keyboard, and the like to enable a user to enter information into and receive information from the computer device. Computer device 800 includes a hardware and/or software implemented network interface unit 805 to communicate with a wired and/or wireless communication network, and to control devices over the network. Computer device 800 also includes a processor 854 (or multiple processors, which may be implemented as software or hardware processors), and memory 856. Computer device 800 further includes a clock/timer subsystem 857 to provide various clock and timing signals to other components. Computer device 800 may also include an ADC 859 for digitizing incoming audio. Network interface unit 805 may include an Ethernet card with a port (or multiple such devices) to communicate over wired Ethernet links and/or a wireless communication card with a wireless transceiver to communicate over wireless links. When computer device 800 represents a controller of an importer-exporter, network interface unit 805 may communicate with an audio client over a communication network connection. Similarly, when the computer device 800 represents a controller of an audio client, network interface unit 805 may communicate with an importer-exporter over a communication network connection.

Memory 856 stores instructions for implementing methods described herein. Memory 856 may include read only memory (ROM), random access memory (RAM), magnetic disk storage media devices, optical storage media devices, flash memory devices, electrical, optical, or other physical/tangible (non-transitory) memory storage devices. The processor 854 is, for example, a microprocessor or a microcontroller that executes instructions stored in memory. Thus, in general, the memory 856 may comprise one or more tangible computer readable storage media (e.g., a non-transitory computer readable medium such as a memory device) encoded with software comprising computer executable instructions and when the software is executed (by the processor 854) it is operable to perform (e.g., cause the processor to perform) the operations described herein. For example, memory 856 stores control logic 858 to perform operations described herein, for example, operations performed by an importer-exporter, an audio client, and so on.

Memory 856 may also store data 860 used and generated by control logic 858.

In summary, in some aspects, the techniques described herein relate to a method performed by at an importer-exporter of an in-band on-channel (IBOC) digital radio broadcasting system: first receiving, from a first audio client, first protocol data units (PDUs) (first PDUs) of encoded main audio and that include first sequence numbers that progress in a first order; sending the first PDUs for transmission over a logical channel of an IBOC waveform; second receiving, from a second audio client, second PDUs of encoded non-main audio and that include second sequence numbers; aligning the second PDUs to the first PDUs by aligning the second sequence numbers to the first sequence numbers, to produce aligned second PDUs; and switching to sending the aligned second PDUs for transmission over the logical channel in place of the first PDUs such that the second sequence numbers of the aligned second PDUs after switching maintain the first order of the first sequence numbers as established by the first PDUs prior to switching.

In some aspects, the techniques described herein relate to a method, wherein: the first sequence numbers are configured to progress incrementally by a fixed amount; and the second sequence numbers are configured to progress incrementally by the fixed amount.

In some aspects, the techniques described herein relate to a method, wherein: each first PDU and each second PDU includes a number N of respective encoded audio packets and the fixed amount is based on the number N.

In some aspects, the techniques described herein relate to a method, further including, at the importer-exporter: upon establishing a first connection with the first audio client, performing first receiving the first PDUs; and upon establishing a second connection with the second audio client, performing second receiving the PDUs.

In some aspects, the techniques described herein relate to a method, wherein the second PDUs include an emergency alert notification originated from an emergency alert system.

In some aspects, the techniques described herein relate to a method, further including: stopping sending the aligned second PDUs to the logical channel; and resuming sending the first PDUs to the logical channel such that the first sequence numbers of the first PDUs maintain an order of the second sequence numbers as established prior to resuming.

In some aspects, the techniques described herein relate to a method, wherein the logical channel includes a supplementary program service (SPS) channel.

In some aspects, the techniques described herein relate to an importer-exporter of an in-band on-channel (IBOC) digital radio broadcasting system, including: a network interface unit; and a processor coupled to the network interface unit and configured to perform: first receiving, from a first audio client, first protocol data units (PDUs) (first PDUs) of encoded main audio and that include first sequence numbers that progress in a first order; sending the first PDUs for transmission over a channel of an IBOC waveform; second receiving, from a second audio client, second PDUs of encoded non-main audio and that include second sequence numbers that are not aligned with the first sequence numbers; aligning the second PDUs to the first PDUs by aligning the second sequence numbers to the first sequence numbers, to produce aligned second PDUs; and switching to sending the aligned second PDUs for transmission over the channel in place of the first PDUs such that the second sequence numbers after switching maintain the first order of the first sequence numbers as established prior to switching.

In some aspects, the techniques described herein relate to an importer-exporter, wherein: the first sequence numbers are configured to progress incrementally by a fixed amount; and the second sequence numbers are configured to progress incrementally by the fixed amount.

In some aspects, the techniques described herein relate to an importer-exporter, wherein: each first PDU and each second PDU includes a number N of respective encoded audio packets and the fixed amount is based on the number N.

In some aspects, the techniques described herein relate to an importer-exporter, wherein the processor is further configured to perform: upon establishing a first connection with the first audio client, performing first receiving the first PDUs; and upon establishing a second connection with the second audio client, performing second receiving the PDUs.

In some aspects, the techniques described herein relate to an importer-exporter, wherein the second PDUs include an emergency alert notification originated from an emergency alert system.

In some aspects, the techniques described herein relate to an importer-exporter, wherein the processor is further configured to perform: stopping sending the aligned second PDUs to the channel; and resuming sending the first PDUs to the channel such that the first sequence numbers of the first PDUs maintain an order of the second sequence numbers as established prior to resuming.

In some aspects, the techniques described herein relate to an importer-exporter, wherein the channel is a logical channel conveyed by a supplementary program service (SPS) logical channel.

In some aspects, the techniques described herein relate to a non-transitory computer readable medium encoded with instructions that, when executed by a processor of an importer-exporter of an in-band on-channel (IBOC) digital radio broadcasting system, cause the processor to perform: first receiving, from a first audio client, first protocol data units (PDUs) (first PDUs) of encoded main audio and that include first sequence numbers that progress in a first order; sending the first PDUs for transmission over a logical channel of an IBOC waveform; second receiving, from a second audio client, second PDUs of encoded non-main audio that are higher in priority than the first PDUs and that include second sequence numbers; aligning the second PDUs to the first PDUs by aligning the second sequence numbers to the first sequence numbers, to produce aligned second PDUs; and switching to sending the aligned second PDUs for transmission over the logical channel in place of the first PDUs such that the second sequence numbers of the aligned second PDUs after switching maintain the first order of the first sequence numbers as established by the first PDUs prior to switching.

In some aspects, the techniques described herein relate to a non-transitory computer readable medium, wherein: the first sequence numbers are configured to progress incrementally by a fixed amount; and the second sequence numbers are configured to progress incrementally by the fixed amount.

In some aspects, the techniques described herein relate to a non-transitory computer readable medium, wherein: each first PDU and each second PDU includes a number N of respective encoded audio packets and the fixed amount is based on the number N.

In some aspects, the techniques described herein relate to a non-transitory computer readable medium, further including instructions to cause the processor to perform: upon establishing a first connection with the first audio client, performing first receiving the first PDUS; and upon establishing a second connection with the second audio client, performing second receiving the PDUs.

In some aspects, the techniques described herein relate to a non-transitory computer readable medium, wherein the second PDUs include an emergency alert notification originated from an emergency alert system.

In some aspects, the techniques described herein relate to a non-transitory computer readable medium, further including instructions to cause the processor to perform: stopping sending the aligned second PDUs to the logical channel; and resuming sending the first PDUs to the logical channel such that the first sequence numbers of the first PDUs maintain an order of the second sequence numbers as established prior to resuming.

Note that in this Specification, references to various features (e.g., elements, structures, modules, components, logic, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations described with reference to the preceding figures illustrate only some of the possible scenarios that may be executed by one or more entities and components discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

Additionally, unless expressly stated to the contrary, the terms 'first', 'second', 'third', etc., are intended to distinguish the particular nouns they modify (e.g., element, condition, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method performed by at an importer-exporter of an in-band on-channel (IBOC) digital radio broadcasting system:
   first receiving, from a first audio client, first protocol data units (PDUs) (first PDUs) of encoded main audio and that include first sequence numbers that progress in a first order;
   sending the first PDUs for transmission over a logical channel of an IBOC waveform;
   second receiving, from a second audio client, second PDUs of encoded non-main audio and that include second sequence numbers;
   aligning the second PDUs to the first PDUs by aligning the second sequence numbers to the first sequence numbers, to produce aligned second PDUs; and
   switching to sending the aligned second PDUs for transmission over the logical channel in place of the first PDUs such that the second sequence numbers of the aligned second PDUs after switching maintain the first order of the first sequence numbers as established by the first PDUs prior to switching.

2. The method of claim 1, wherein:
   the first sequence numbers are configured to progress incrementally by a fixed amount; and
   the second sequence numbers are configured to progress incrementally by the fixed amount.

3. The method of claim 2, wherein:
   each first PDU and each second PDU includes a number N of respective encoded audio packets and the fixed amount is based on the number N.

4. The method of claim 1, further comprising, at the importer-exporter:
   upon establishing a first connection with the first audio client, performing first receiving the first PDUs; and upon establishing a second connection with the second audio client, performing second receiving the PDUs.

5. The method of claim 4, wherein the second PDUs include an emergency alert notification originated from an emergency alert system.

6. The method of claim 1, further comprising:
stopping sending the aligned second PDUs to the logical channel; and
resuming sending the first PDUs to the logical channel such that the first sequence numbers of the first PDUs maintain an order of the second sequence numbers as established prior to resuming.

7. The method of claim 1, wherein the logical channel includes a supplementary program service (SPS) channel.

8. An importer-exporter of an in-band on-channel (IBOC) digital radio broadcasting system, comprising:
a network interface unit; and
a processor coupled to the network interface unit and configured to perform:
first receiving, from a first audio client, first protocol data units (PDUs) (first PDUs) of encoded main audio and that include first sequence numbers that progress in a first order;
sending the first PDUs for transmission over a channel of an IBOC waveform;
second receiving, from a second audio client, second PDUs of encoded non-main audio and that include second sequence numbers that are not aligned with the first sequence numbers;
aligning the second PDUs to the first PDUs by aligning the second sequence numbers to the first sequence numbers, to produce aligned second PDUs; and
switching to sending the aligned second PDUs for transmission over the channel in place of the first PDUs such that the second sequence numbers after switching maintain the first order of the first sequence numbers as established prior to switching.

9. The importer-exporter of claim 8, wherein:
the first sequence numbers are configured to progress incrementally by a fixed amount; and
the second sequence numbers are configured to progress incrementally by the fixed amount.

10. The importer-exporter of claim 9, wherein:
each first PDU and each second PDU includes a number N of respective encoded audio packets and the fixed amount is based on the number N.

11. The importer-exporter of claim 8, wherein the processor is further configured to perform:
upon establishing a first connection with the first audio client, performing first receiving the first PDUs; and
upon establishing a second connection with the second audio client, performing second receiving the PDUS.

12. The importer-exporter of claim 11, wherein the second PDUs include an emergency alert notification originated from an emergency alert system.

13. The importer-exporter of claim 8, wherein the processor is further configured to perform:
stopping sending the aligned second PDUs to the channel; and
resuming sending the first PDUs to the channel such that the first sequence numbers of the first PDUs maintain an order of the second sequence numbers as established prior to resuming.

14. The importer-exporter of claim 8, wherein the channel is a logical channel conveyed by a supplementary program service (SPS) logical channel.

15. A non-transitory computer readable medium encoded with instructions that, when executed by a processor of an importer-exporter of an in-band on-channel (IBOC) digital radio broadcasting system, cause the processor to perform:
first receiving, from a first audio client, first protocol data units (PDUs) (first PDUs) of encoded main audio and that include first sequence numbers that progress in a first order;
sending the first PDUs for transmission over a logical channel of an IBOC waveform;
second receiving, from a second audio client, second PDUs of encoded non-main audio that are higher in priority than the first PDUs and that include second sequence numbers;
aligning the second PDUs to the first PDUs by aligning the second sequence numbers to the first sequence numbers, to produce aligned second PDUs; and
switching to sending the aligned second PDUs for transmission over the logical channel in place of the first PDUs such that the second sequence numbers of the aligned second PDUs after switching maintain the first order of the first sequence numbers as established by the first PDUs prior to switching.

16. The non-transitory computer readable medium of claim 15, wherein:
the first sequence numbers are configured to progress incrementally by a fixed amount; and
the second sequence numbers are configured to progress incrementally by the fixed amount.

17. The non-transitory computer readable medium of claim 16, wherein:
each first PDU and each second PDU includes a number N of respective encoded audio packets and the fixed amount is based on the number N.

18. The non-transitory computer readable medium of claim 15, further comprising instructions to cause the processor to perform:
upon establishing a first connection with the first audio client, performing first receiving the first PDUs; and
upon establishing a second connection with the second audio client, performing second receiving the PDUs.

19. The non-transitory computer readable medium of claim 18, wherein the second PDUs include an emergency alert notification originated from an emergency alert system.

20. The non-transitory computer readable medium of claim 15, further comprising instructions to cause the processor to perform:
stopping sending the aligned second PDUs to the logical channel; and
resuming sending the first PDUs to the logical channel such that the first sequence numbers of the first PDUs maintain an order of the second sequence numbers as established prior to resuming.

* * * * *